Figure 1:
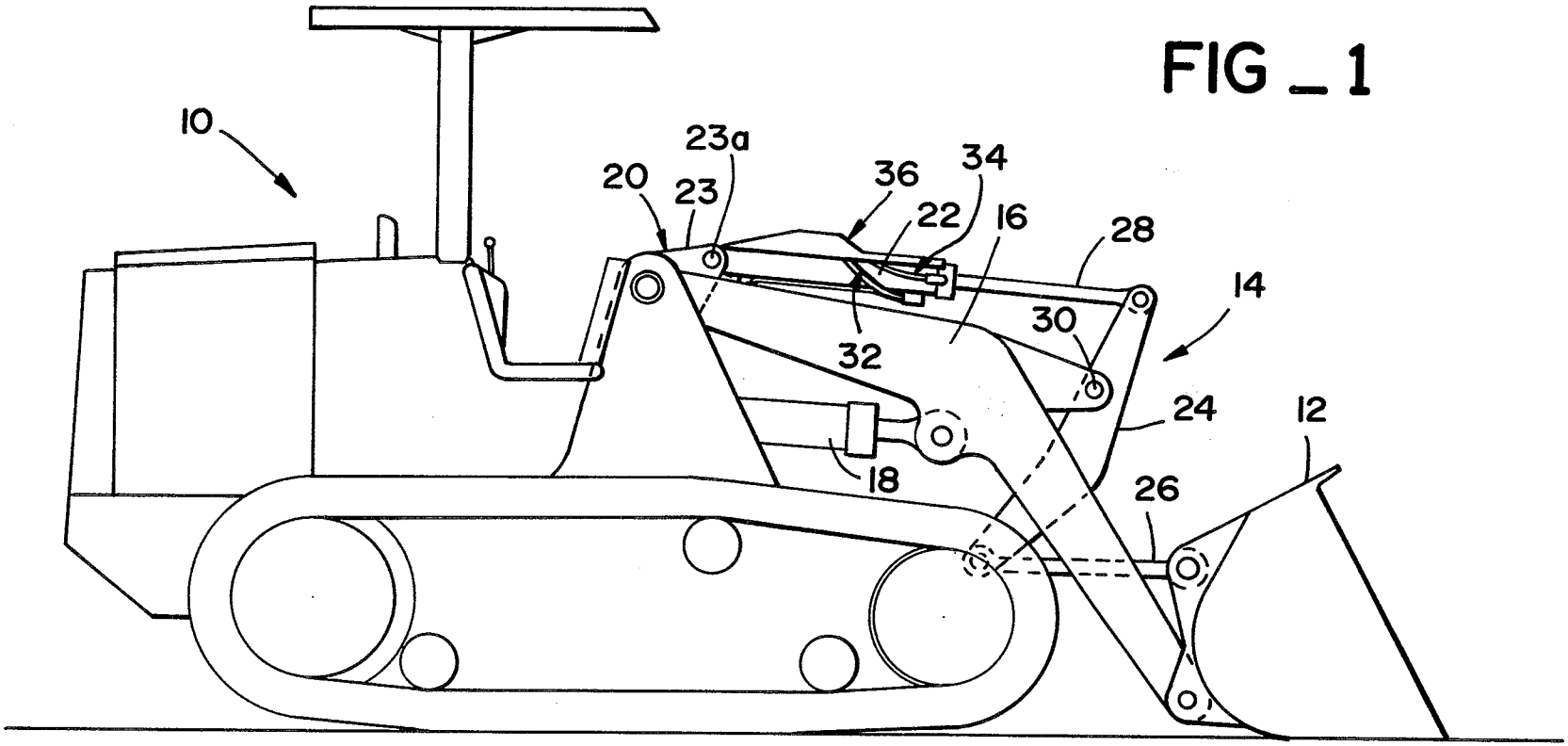
Figure 2:
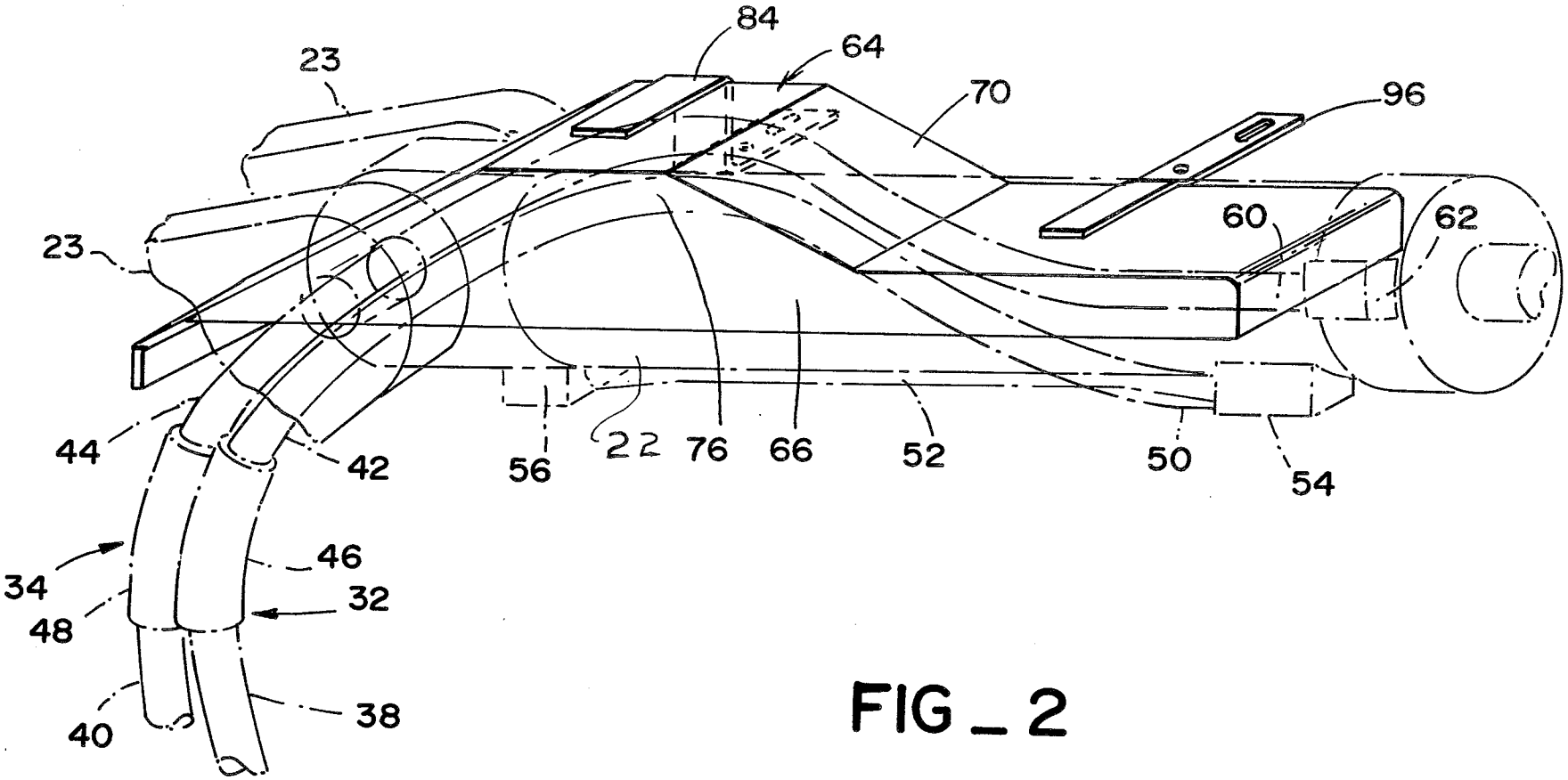
Figure 4:
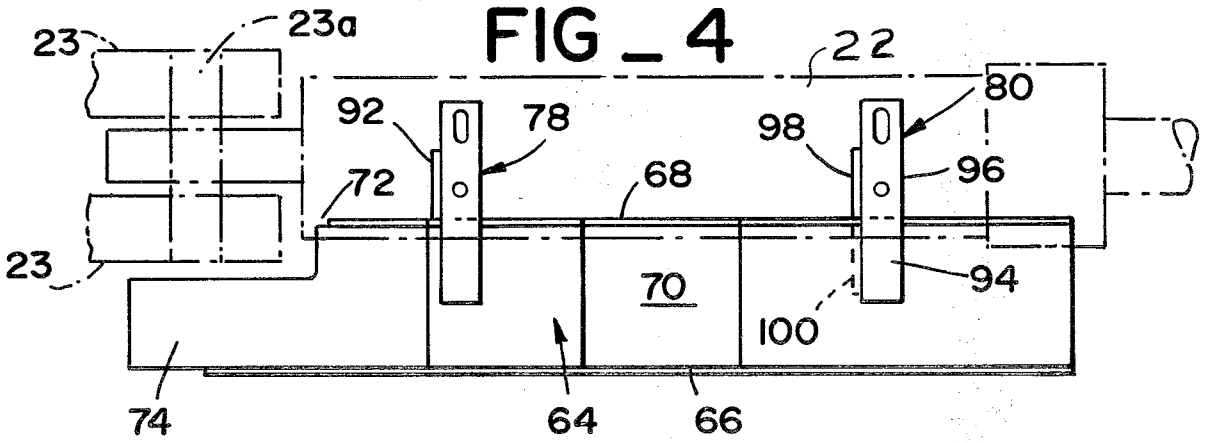
Figure 3:
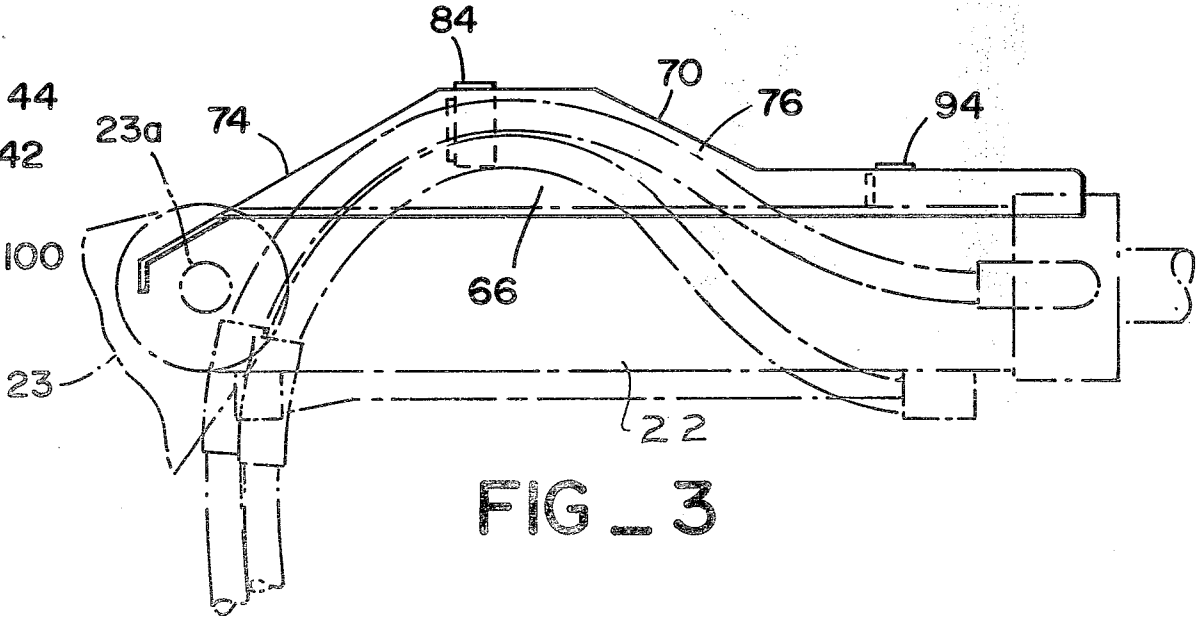
Figure 5:
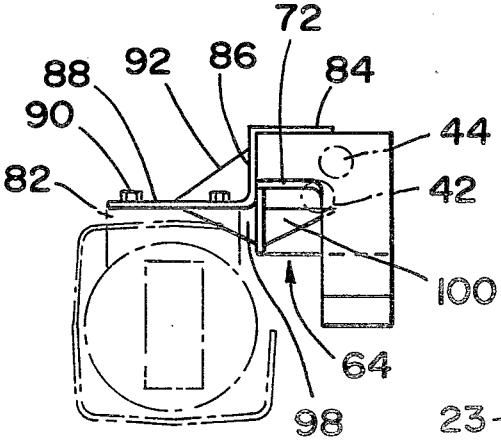

United States Defensive Publication [19] (H) [11] T974,001

Neal [43] Sep. 5, 1978

[54] GUARD FOR TILT CYLINDER HOSES AND FITTINGS

[75] Inventor: James G. Neal, Peoria, Ill.

[73] Assignee: Caterpillar Tractor Co., Peoria, Ill.

[21] Appl. No.: 813,727

[22] Filed: Jul. 7, 1977

[51] Int. Cl.[2] ..... E02F 3/70

[52] U.S. Cl. ..... 214/140; 137/377

[57] ABSTRACT

A loader vehicle having a frame including an ear, a tilt cylinder, having one end extending along one side of the ear, and pivotally connected thereto, for tilting a bucket, hydraulic hoses and fittings extending alongside the cylinder to supply hydraulic fluid thereto, and a guard for the hoses and fittings. The guard includes an inverted U-shaped cover extending over the hoses up to the ear, a plate cover segment narrower than and extending from the U-shaped cover along the other side of the ear to protect the fittings, and a plurality of brackets which connect the U-shaped cover to the tilt cylinder.

10 Claims, 3 Sheets Drawing,

7 Pages Specification

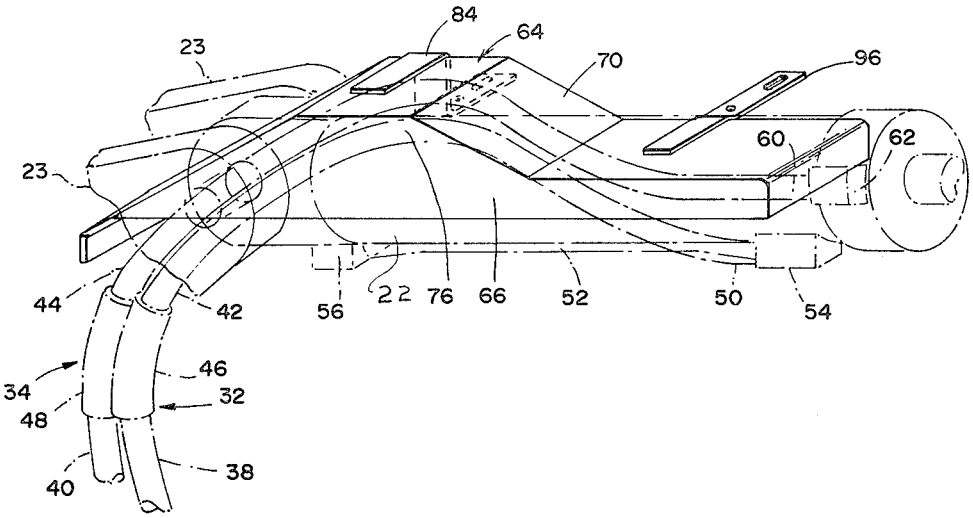

The file of this unexamined application may be inspected and copies thereof may be purchased (849 O.G. 1221, Apr. 9, 1968).